US011707760B2

(12) United States Patent
Santoro et al.

(10) Patent No.: US 11,707,760 B2
(45) Date of Patent: Jul. 25, 2023

(54) IMPREGNATION PLANT AND METHOD FOR COMPONENTS OF ELECTRIC MOTORS

(71) Applicant: TECNOFIRMA S.P.A., Monza (IT)

(72) Inventors: Fabrizio Santoro, Cinisello Balsamo (IT); Francesco Goi, Giussano (IT)

(73) Assignee: TECNOFIRMA S.P.A., Monza (IT)

( * ) Notice: Subject to any disclaimer, the term of this patent is extended or adjusted under 35 U.S.C. 154(b) by 381 days.

(21) Appl. No.: 16/771,924

(22) PCT Filed: Dec. 13, 2018

(86) PCT No.: PCT/IB2018/060010
§ 371 (c)(1),
(2) Date: Jun. 11, 2020

(87) PCT Pub. No.: WO2019/123137
PCT Pub. Date: Jun. 27, 2019

(65) Prior Publication Data
US 2021/0162450 A1 Jun. 3, 2021

(30) Foreign Application Priority Data

Dec. 22, 2017 (IT) .......................... 102017000149039

(51) Int. Cl.
*B05C 5/02* (2006.01)
*B05C 13/02* (2006.01)
(Continued)

(52) U.S. Cl.
CPC .............. *B05C 5/022* (2013.01); *B05C 5/027* (2013.01); *B05C 5/0291* (2013.01);
(Continued)

(58) Field of Classification Search
CPC ..................................................... H02K 15/12
See application file for complete search history.

(56) References Cited

U.S. PATENT DOCUMENTS 3,457,899 A * 7/1969 Kelch ................... H02K 15/12
118/503
5,024,857 A * 6/1991 Arakawa ............... H02K 15/12
427/104
(Continued)

FOREIGN PATENT DOCUMENTS

AU 4207768 A 2/1970
DE 1538918 A1 11/1970
(Continued)

OTHER PUBLICATIONS

International Search Report and Written Opinion dated Mar. 25, 2019 for PCT/IB2018/060010 to Tecnofirma S.P.A. filed Dec. 13, 2018.

*Primary Examiner* — Dah-Wei D. Yuan
*Assistant Examiner* — Stephen A Kitt
(74) *Attorney, Agent, or Firm* — Vorys, Sater, Seymour and Pease LLP

(57) ABSTRACT

Impregnation plant for internally hollow cylindrical components (stators) of electric motors including working stations arranged linearly and sequentially, managed and controlled by central processing unit; and a plurality of motor-driven elements to impart rotatory motion, in both directions of rotation, and tilting motion, in both directions respective to a predefined plane, to each component mounted onto a respective support device when such support device is inserted into the plant working stations. Each support device has a spring collet in turn has blocks clamping the component onto the inner diameter of its respective cylindrical body. Each spring collet entirely crosses the component cylindrical body to rest on both of its respective circumferential ends. An impregnation method for electric motor components using the impregnation plant, wherein the component is rotatable in both directions about a support device predefined axis, and tiltable respective to a predefined plane of such support device.

14 Claims, 4 Drawing Sheets

(51) Int. Cl.
　　　*H02K 15/06*　　　(2006.01)
　　　*H02K 15/12*　　　(2006.01)
　　　*B05D 1/00*　　　(2006.01)
　　　*B05D 3/00*　　　(2006.01)
　　　*B05D 3/02*　　　(2006.01)

(52) U.S. Cl.
　　　CPC ............ *B05C 13/025* (2013.01); *B05D 1/002* (2013.01); *B05D 3/005* (2013.01); *B05D 3/0254* (2013.01); *B05D 3/207* (2013.01); *H02K 15/063* (2013.01); *H02K 15/12* (2013.01)

(56) References Cited

U.S. PATENT DOCUMENTS

| | | | | |
|---|---|---|---|---|
| 5,401,531 | A | * | 3/1995 | Faraoni .................. H02K 15/12 427/127 |
| 5,685,910 | A | * | 11/1997 | Thigpen ................. H02K 15/12 118/712 |
| 6,056,845 | A | * | 5/2000 | Rachkov ................ H02K 15/12 156/308.2 |
| 2006/0165879 | A1 | * | 7/2006 | Kimura .................. H02K 15/12 427/104 |

FOREIGN PATENT DOCUMENTS

| | | | |
|---|---|---|---|
| DE | 1538918 | * | 12/1970 |
| GB | 2154157 | A | 9/1985 |
| IT | 1177448 | B | 8/1987 |

\* cited by examiner

IMPREGNATION PLANT AND METHOD FOR COMPONENTS OF ELECTRIC MOTORS

CROSS-REFERENCE TO RELATED APPLICATIONS

This is a § 371 National Stage Application of International Application No. PCT/IB2018/060010 filed on Dec. 13, 2018, claiming the priority of Italian Patent Application No. 102017000149039 filed on Dec. 22, 2017.

FIELD OF THE INVENTION

The present invention generally relates to an impregnation plant and an impregnation method for components of electric motors and, in particular but not exclusively, to an impregnation plant and an impregnation method for electric windings and stators manufactured according to the so-called "hair pin" technology.

BACKGROUND OF THE INVENTION

As is known, an electric motor is formed of a stator and a rotor. These two components, when properly combined together, generate a magnetic field as necessary for the operation of the electric motor.

In electric motors using a wire wound stator, the stator is in fact provided with windings traditionally formed of a coil of copper wires. The coil of copper wires shall be impregnated with specific resins in order to increase its mechanical strength.

Unlike electric motors using wound wire stators, in an electric motor using a "hair pin" stator such stator is provided with a plurality of metal bars, typically made from copper, instead of a coil of copper wires. Electric motors using hair pin stators are widely used in the automotive sector. Because of the heavy-duty use which they are intended for, the metal bars of the electric motors using "hair pin" stators also require an impregnation with specific resins in order to increase their mechanical strength and to prevent wires from rubbing with each other, which might result in jeopardizing their insulation.

Irrespective of the manufacturing technology, a stator for electric motors generally consists of an internally hollow cylinder. The copper wires or bars are incorporated in the wall of the cylinder and run all along the length of such wall, in the direction of their respective generatrixes, and consequently they project at the two circumferential ends, or heads, of the cylinder itself.

An impregnation process for stators of electric motors can traditionally be implemented by using the so-called "trickling" technology. The traditional process comprises a first step wherein the stator is pre-heated to a predefined temperature, which is variable according to the type of resin that will be used.

Following the pre-heating step, a specific amount of resin is trickled onto well determined zones of the copper wires or bars, for a determined period of time and according to a determined sequence of positioning of the dispensers of the impregnation plant. The parameters relevant to amount of resin, dispensing time and dispenser positionings vary according to the type of stator.

During impregnation, the stator shall be held in rotation in order to prevent resin from trickling (trickle losses). The resin, which is only deposited onto the heads of the cylinder which forms the stator, flows by capillarity along the wires or bars, up to penetrating and filling the cavities placed inside the wall of such cylinder. The main aim of an impregnation process is to saturate all of these cavities, with a consequent compacting of the wires aiming at prevent them from rubbing.

After the trickling step, the stator, still held in rotation, undergoes a high temperature baking step. This step first causes a gelation (the resin thickens or, in other words, its viscosity rises up to glass transition which determines its transition from the liquid state to the solid state) and subsequently the baking of the resin, which polymerizes and definitively hardens. During this step the stator is held in rotation, because the rotation movement is an essential condition during gelation, whereas it is just a recommended condition during the baking step.

After the baking step, the stator might be cooled down before being unloaded from the impregnation plant. These cooling down step is usually performed, however it is not decisive for a good success of the impregnation process.

The evolution of electric motors, used in particular in the automotive sector, gave rise to stators wherein the wires (in the case of wound wire stators) or the bars (in the case of "hair pin" stators) are much compressed. In other words, the interstices or cavities between the individual wires or bars are very narrow and/or winding.

Consequently, whereas it was sufficient to trickle the resin onto the heads of the stator in the case of traditional electric motors, such stator being arranged horizontally and held in rotation about its own axis, in the case of the present electric motors such process is not effective any longer. As a matter of fact, such process does not make it possible to guarantee that the resin effectively fills all cavities/interstices between the individual wires and, most of all, between the individual bars, which are typically arranged according to an extremely compact configuration. Besides providing penetration of the resin, a good impregnation process is such as to prevent the surfaces from being dirtied, or at least to limit such dirtying.

Impregnation plants for components of electric motors are known, such as, for instance, those described in documents DE 1538918 A1, IT 1177448 B, U.S. Pat. No. 5,685,910 A, and AU 4207768 A respectively. Document DE 1538918 A1 discloses an impregnation plant for components of electric motors, in particular rotors of electric motors, wherein the rotor is held in a vertical position for being induction heated. Then the rotor, still being in a vertical position, undergoes an impregnation step. Then the rotor is arranged horizontally and goes through the plant with the possibility for it of rotating about its own axis, and enters a baking oven. However, in a plant according to document DE 1538918 A1 apparently no possibility is provided for a rotor of tilting and rotating in the impregnation station.

Document AU 4207768 A discloses an impregnation plant for rotors of electric motors wherein each rotor can be tilted during the impregnation step and can be made rotate at an adjustable speed. However, the plant according to document AU 4207768 A is a "static" one, i.e. it comprises one workstation only which performs the pre-heating, impregnation, and baking steps.

In general, the impregnation methods for rotors of electric motors substantially differ from those used for stators of electric motors, in particular from those used for "hair pin" stators. As a matter of fact, in order to perform a correct impregnation in such type of stators, it is necessary to have the following tools at disposal:

specific collets, designed to make it possible a geometric positioning of the tricklers inside the stator;

specific tilting modules, capable of controlling all tilting movements of the axes and the different rotations as a function of the points where the impregnating resin is to be applied;

calibrated centering pins, configured for accommodating a device that transports the collet-stator assemblies;

specific clutches which, once the impregnation step is completed, are movable to guarantee a continuous rotation of the stator from a workstation to another one, thus preventing resin losses from the stator itself;

specific thermal recovery sources and inductive movable assemblies in the trickling stations.

In an impregnation plant, a complete availability of all of these tools makes a corresponding impregnation method for "hair pin" stators effective.

Document IT 1177448 B discloses a traditional impregnation plant wherein each stator is put on a cantilevered collet. In this plant there are no provisions for induction heating, nor there is any possibility of tilting the stators, and the collets are constrained to the transport chain in a rigid architecture. Finally, document U.S. Pat. No. 5,685,910 A discloses a laboratory machine configured to process individual components, put in a vertical position but with tilting capabilities.

SUMMARY OF THE INVENTION

An object of the present invention is thus to provide an impregnation plant and an impregnation method for components of electric motors that are capable of solving the above-mentioned drawbacks of the prior art in a particularly functional manner.

In details, an object of the present invention is to provide an impregnation plant and an impregnation method for components of electric motors that allow to coat the wires or bars of the windings of each individual component with resins or other similar fluids in a complete and effective manner.

Another object of the present invention is to provide an impregnation plant and an impregnation method for components of electric motors that allow to precisely control each step of the method itself.

These objects according to the present invention are achieved by way of an impregnation plant and an impregnation method for components of electric motors as disclosed in the independent claims.

Further characteristics of the invention are highlighted in the dependent claims, which are an integral part of the present disclosure.

In particular, as already mentioned before, the parameters that are traditionally controllable in an impregnation plant according to the prior art are the speed of rotation of the component (stator), the positioning of the nozzles used to dispense the resin, and the flow rate of the dispensed resin. The impregnation plant according to the present invention also controls the parameters related to the sense of rotation, either clockwise or counterclockwise, of the component (stator) and the tilt of such component (stator) with respect to a predefined axis of rotation, as well as the possibility of varying the speed of rotation independently in the individual impregnation stations.

Controlling sense of rotation and controlling tilt are indispensable for controlling the behavior of the resin dispensed onto the metal material which the windings are made from. Otherwise, the resin would not be able to penetrate the cavities of the windings and would finally follow other paths, different from those which contribute to achieve the result of a total coating of the windings themselves, and would possibly dirty the surface of the laminated core.

BRIEF DESCRIPTION OF THE DRAWING

The characteristics and advantages of an impregnation plant and an impregnation method for components of electric motors according to the present invention will be more apparent from the following description, which is provided for explanatory non-limitative purposes only, which makes reference to the attached schematic drawings, wherein.

Figure 1:
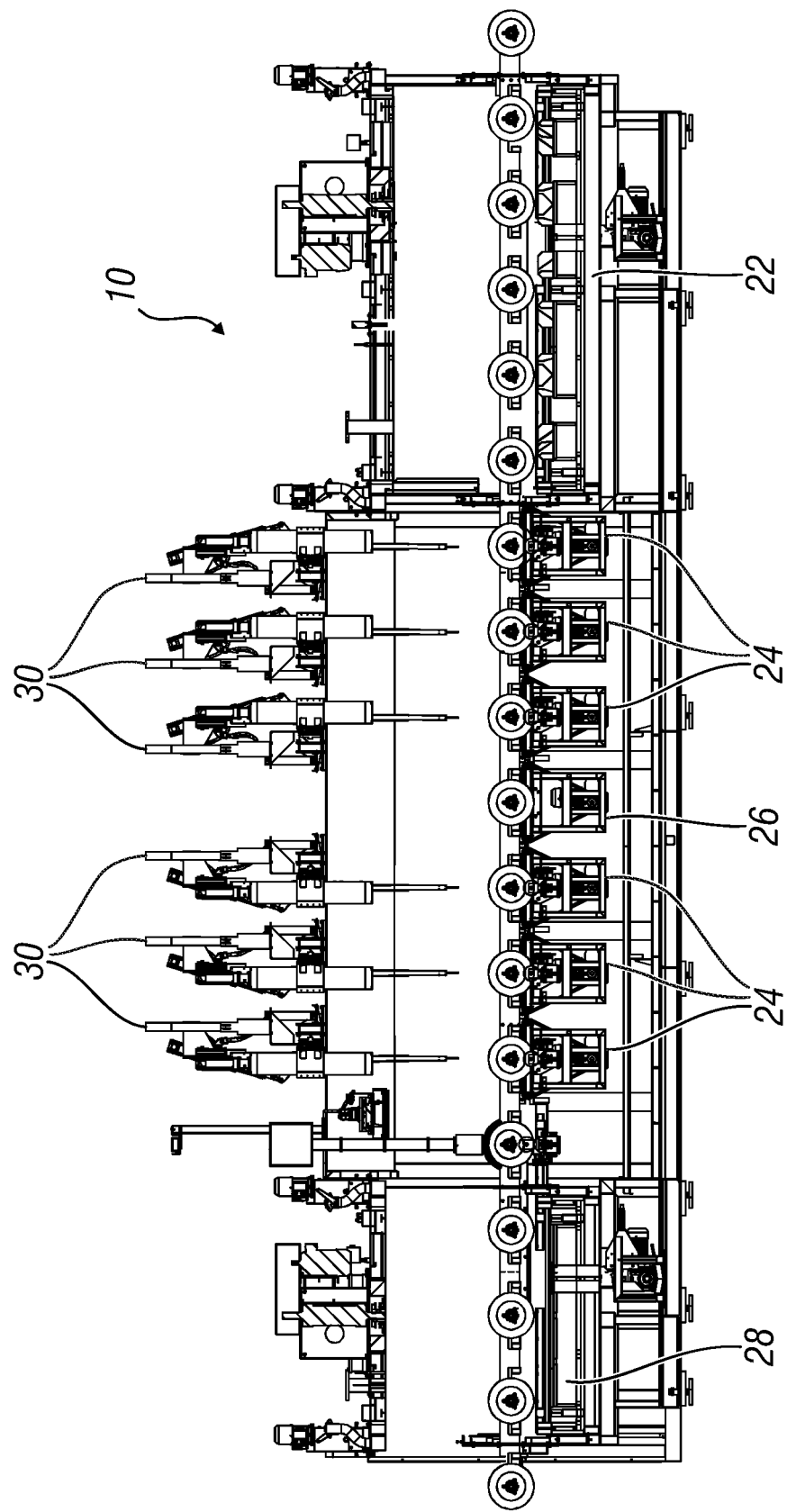
FIG. 1 is a side elevation view of an embodiment of the impregnation plant for components of electric motors according to the present invention.

With a specific reference to FIG. 1, an embodiment of the impregnation plant for components of electric motors according to the present invention, identified by the reference numeral 10 as a whole, is here shown. The plant 10 comprises a plurality of working stations arranged linearly and sequentially one after another, wherein each component 100 is first prepared for impregnation, then at least partially coated with an impregnating substance (resin), and subsequently finished in a fully automated manner. As a matter of fact, all working stations that form the plant 10 are managed and controlled by a central processing unit (CPU) the function of which is to program, control, manage, and optimize all steps of the impregnation method.

Figure 5:
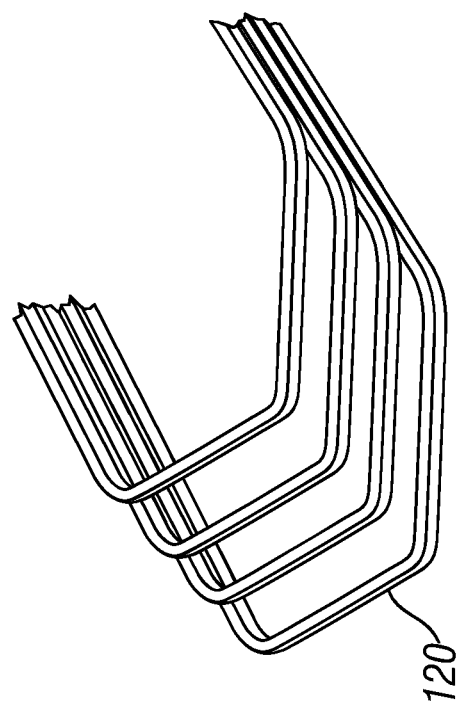
FIG. 5 is a perspective view of the metal bars that form the winding of the stator depicted in FIG. 4.
Figure 4:
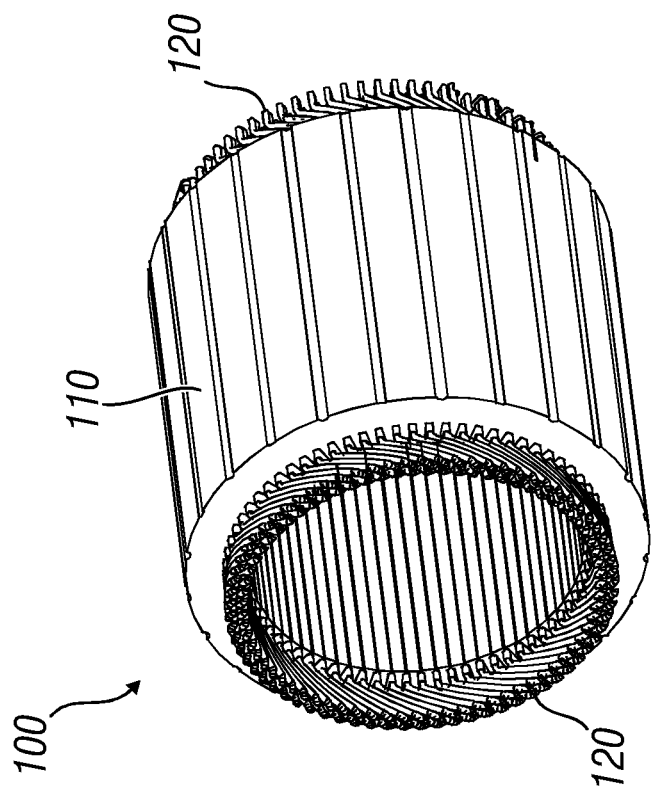
FIG. 4 is a perspective view of a typical component part to be impregnated, specifically formed of a "hair pin" stator.

Specifically, as shown in FIGS. 4 and 5, each component 100 to be impregnated is typically a stator for electric motors comprising an internally hollow cylindrical body 110. The cylindrical body 110 is provided with windings formed of metal wires or bars 120 incorporated in the wall of the cylindrical body 110, which run all along the length of such wall, in the direction of their respective generatrixes, thus projecting at the two circumferential ends, or heads, of the cylindrical body 110 itself. The surface of the windings, in particular that incorporated in the wall of the cylindrical body 110, shall be fully coated with an impregnating substance (resin) in order to increase the mechanical strength of the windings themselves.

DETAILED DESCRIPTION OF THE PREFERRED EMBODIMENTS

The plant 10 comprises first of all a plurality of support devices 12 for supporting the individual components 100. Each support device 12 rotatably supports the respective component 100 and is configured to be inserted into the individual working stations that form the plant 10.

Each support device 12 is provided with a spring collet 14, which is in turn provided with blocks which are used to clamp the component 100 onto the inner diameter of the respective cylindrical body 110. The spring collet 14 entirely crosses the cylindrical body 110 of the component 100, so as to possibly rest on both the respective circumferential ends. This feature makes it possible for the component 100 both to rotate, in the two directions of rotation, and to tilt, in both directions with respect to a predefined plane, during the impregnating substance trickling process, as better described below.

Each support device 12 preferably comprises a pallet configured to make the rotation of the spring collet 14 possible. In details, each of the two ends of the spring collet 14 rests on one or more rollers 16 placed on respective opposing ends of the support device 12.

Figure 2:
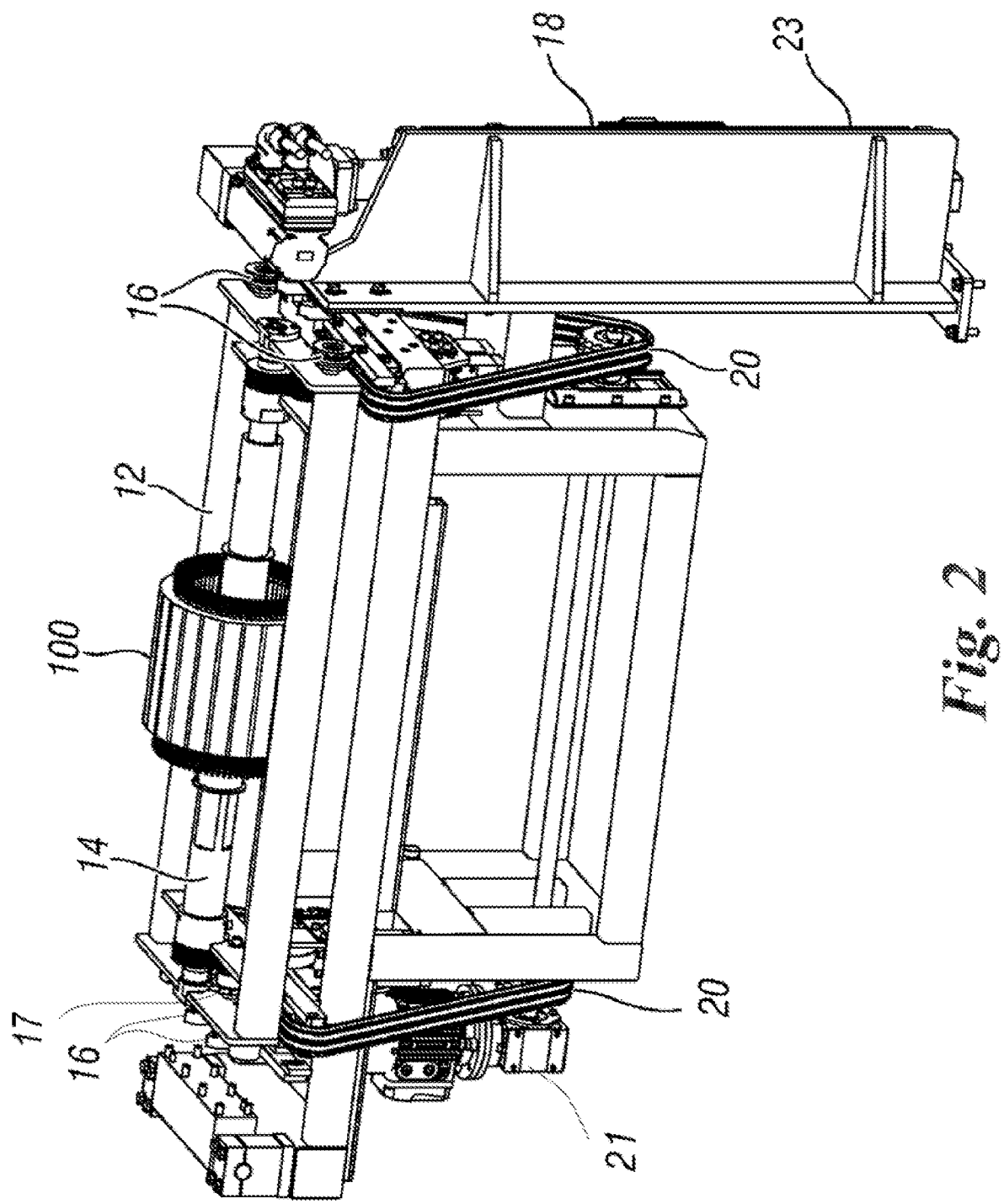
FIG. 2 is a perspective view of a workstation of the impregnation plant depicted in FIG. 1.
Figure 3:
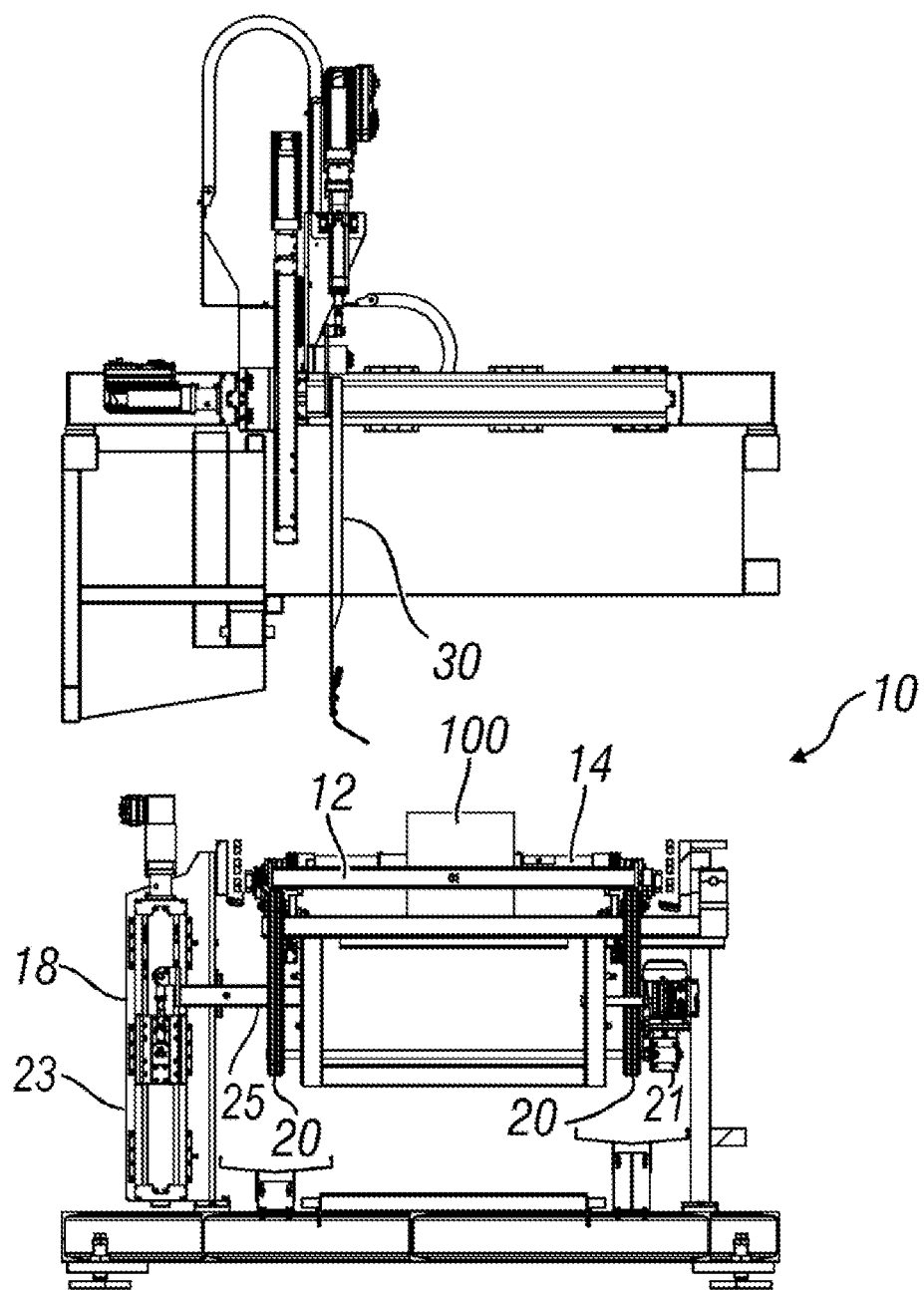
FIG. 3 is another side elevation view of the workstation depicted in FIG. 2, wherein an impregnation device is also highlighted.

The plant 10 comprises a plurality of motor-driven means 18 configured to impart both a rotatory motion, in both directions of rotation, and a tilting motion, in both directions with respect to a predefined plane, on each component 100 mounted on its respective support device 12, when such support device 12 is inserted into the working stations of such plant 10. The motor driven means 18 includes: a first set of one or more rollers 16 and a second set of one or more rollers 16 placed at respective opposing ends of the support device 12 as shown in FIG. 2; a first chain transmission device 20 and a second chain transmission device 20 placed at respective opposing ends of the support device 12 as shown in FIG. 2; a motor 21 and a tilting device 23 placed at respective opposing ends of the support device 12 as shown in FIG. 2. The tilting device 23 is connected by a member 25 to the support device 12 as shown in FIG. 3 to provide the tilting motion, in both directions with respect to a predefined plane, on each component 100 mounted on its respective support device 12, when such support device 12 is inserted into the working stations of such plant 10. In particular, the motor 21 of the motor-driven means 18 imparts a rotatory motion to the first set of rollers 16 placed on one single side of the support device 12, via a first chain transmission device 20 which acts onto two pinions integral with such rollers of the first set of rollers 16. On the other side of the support device 12, the second set of rollers 16 are idle and free to follow the rotatory motion of the spring collet 14.

The plant 10 also comprises one or more heating stations 22, configured to heat each individual component 100 to a predefined temperature, which is variable as a function of the type of impregnating substance that will be used in the subsequent working stations. Each component 100 is introduced into the heating station 22 after being mounted onto a respective support device 12. Each component 100, once introduced into the heating station 22, is driven into rotation on its respective support device 12, as better specified below.

The plant 10 also comprises, downstream of the heating stations 22, one or more impregnation stations 24, configured to cover at least a portion of each component 100 with an impregnating substance. The motor-driven means 18 which operate at each impregnation station 24 are configured to impart to each component 100 both a rotatory motion about the axis of the spring collet 14, in both directions, and a tilting motion of such axis of the spring collet 14 with respect to a predefined plane of the support device 12.

Each impregnation station 24 is provided, preferably at its upper part, with one or more impregnating substance dispenser means 30, moved by controlled axles. The dispenser means 30 are positioned in their exact positions where the impregnating substance is to be dispensed, via their respective axles, according to a predefined amount and period of time. The dispenser means 30 are fed via one or more metering pumps, configured to accurately meter the impregnating substance.

The plant 10 might comprise at least one temperature recovery station 26 between adjacent pairs of impregnation stations 24. Each temperature recovery station 26 is configured to set a predefined temperature value on each component 100, coming from the impregnation station 24 arranged upstream of such temperature recovery station 26, before entering the subsequent impregnation station 24.

The plant 10 also comprises, downstream of the impregnation stations 24, at least one gelling station 28 and at least one baking station, arranged sequentially to each other, configured to fix the impregnating substance on each component 100, via subsequent steps described in more details below. At least the gelling station 28 might be provided with an induction heating system, configured to rapidly rise the temperature of the component 100.

The number of impregnation stations 24 that a plant 10 is provided with is variable and depends on the cadence requested to the plant 10 itself, as well as on the time requested by each component 100 to absorb the resin. In one preferred but non-limitative embodiment, the plant 10 can sequentially comprise five heating stations 22, two sets each comprising three impregnation stations 24, separated by two temperature recovery stations 26, and three gelling and baking stations 28.

The impregnation method for components of electric motors according to the present invention consequently comprises the following operating steps. The first and last steps of such method possibly consist of respective weighing operations.

As a matter of fact, each component 100 is automatically weighed both before entering its respective support device 12, i.e. before entering the plant 10, and after being unloaded from its respective support device 12, i.e. after leaving the plant 10, in order to monitor the effectiveness of the impregnation method. The difference in weight between the component 100 before applying the impregnating substance and the same component 100 after applying the impregnating substance provides an indication on how much solid impregnating substance (resin) remained on such component 100, thus determining a first qualitative assessment of the component 100 itself.

Then the method comprises a step whereby each component 100 is inserted onto the spring collet 14 of a respective support device 12, so that the component 100 is rotatable in both directions about the axis of such spring collet 14, as well as tiltable with respect to a predefined plane of the support device 12.

A preliminary step of pre-heating such component 100 before entering the plant 10 is possibly specified before the step of inserting each individual component 100 onto its respective support device 12. Not necessarily shall the component 100 be in rotation during this preliminary pre-heating step, which can be performed either rapidly by using an induction heating system, or slowly by using a hot air blowing system.

The method also comprises a step of loading each individual support device 12 complete with its respective component 100 in the plant 10, so that the motor-driven means 18 can engage the spring collet 14 and make the component 100 rotate in both directions of rotation about the axis of such spring collet 14 and/or tilt such component 100 with respect to a predefined plane of the support device 12.

At this point, the component 100 undergoes a heating step, during which the spring collet 14 and the component 100 supported by it are made rotate in one or both directions about the axis of such spring collet 14. During the heating step, each component 100 moves forward inside the heating station 22, step by step, up to reaching the optimum temperature for the subsequent impregnation or resin coating step.

During the impregnation or resin coating step, each component 100 is made rotate in both directions (as a function of the geometric requirement of the winding), at a variable speed, independent of the remaining working stations of the plant 10, about the axis of the spring collet 14 and/or is tilted with respect to a predefined plane of the support device 12, so as to be at least partially, but effectively, coated with the impregnating substance. In each impregnation station 24, the speed of rotation, the sense of rotation, and the angle of tilt of the component 100 are controlled in a fully independent manner with respect to the remaining working stations of the plant 10.

A gelling step is provided after the impregnation or resin coating step, during which the spring collet 14 and the component 100 supported by it are made rotate in one or both directions and are brought to a temperature that is suitable for baking the resin. Since the baking temperature is higher than the temperatures of the heating and pre-heating steps, the gelling step can be performed by way of an induction heating system, configured for rapidly raising the temperature of the component 100.

After the gelling step, which results in a first thickening of the resin, a baking step is performed to obtain the final solidification of the resin. It is advisable, even if not indispensable, to drive the spring collet 14 and the component 100 supported by it into rotation also during the baking step. The times and temperatures used both in the gelling step and in the baking step depend on the type of resin used in the previous impregnation or resin coating step.

After the baking step, it is advisable to perform a cooling step, configured for bringing the component 100 down to a temperature that is compatible with the requirements of the manufacturing line downstream of the plant 10, where such component 100 will continue its assembling path.

The impregnation plant and the impregnation method for components of electric motors described so far are particularly effective in processing "hair pin" stators, an embodiment of which is shown in FIGS. 4 and 5. As a matter of fact, in this type of stators the metal bars that form the windings are joined two by two, by welding, at either end or head of the cylinder.

Following this welding process, the metal bars lose, on these ends, the insulating surface layer with which they are coated upon being manufactured. It is therefore necessary to coat the welded ends of the bars again with appropriate insulating substances. One of these insulating substances comprises, for example, a so-called "gel coat" resin.

The here disclosed impregnation plant 10 is well suited for performing this coating process. As a matter of fact, it is sufficient to add, downstream of the gelling station 28 and upstream of the baking station, one or more further impregnation stations 24 configured to dispense a further insulating substance, such as for instance "gel coat", aiming at coating welded or insulation-free metal areas.

It is thus proved that the impregnation plant and the impregnation method for components of electric motors according to the present invention achieve the previously highlighted objects.

The thus conceived impregnation plant and impregnation method for components of electric motors according to the present invention are in any case susceptible of numerous modifications and variants, all falling within the scope of the same inventive concept; also, all details are replaceable with technically equivalent elements. In practice, the materials used, as well as shapes and dimensions, can be materials, shapes, and dimensions whatsoever, depending on the technical requirements.

Therefore, the scope of protection of the invention is that defined by the attached claims.

The invention claimed is:
1. An impregnation plant for internally hollow cylindrical components of electric motors, said plant comprising a plurality of working stations arranged linearly and sequentially one after another, said working stations being managed and controlled by a central processing unit, said plant comprising:
   a plurality of support devices for each component, wherein each support device rotatably supports the respective component and is configured to be inserted into the individual working stations that form the plant;
   one or more heating stations, configured to heat each component to a predefined temperature;
   one or more impregnation stations, arranged downstream of the heating stations and configured to cover at least a portion of each component with an impregnating substance;
   at least one gelling station and at least one baking station, arranged in sequence to each other and downstream of the impregnation stations, configured to fix the impregnating substance on each component; and
   a first set of one or more rollers and a second set of one or more rollers placed at respective opposing ends of the support device;
   a first chain transmission device and a second chain transmission device placed at respective opposing ends of the support device;
   a motor and a tilting device placed at respective opposing ends of the support device, the tilting device connected to the support device;
   the first chain transmission device operably coupled to the motor and the first set of one or more rollers of each support device, the first chain transmission device configured to impart a rotatory motion, in both directions of rotation to each component mounted on the respective support device when said support device is inserted into the working stations of said plant, and
   the second chain transmission device operably coupled to the second set of one or more rollers of each support device;
   the tilting device connected to the support device to impart a tilting motion, in both directions with respect to a predefined plane, to each component mounted on the respective support device when said support device is inserted into the working stations of said plant,
   wherein each support device is provided with a spring collet, said spring collet entirely crossing a cylindrical body of the component, so as to rest on both of its respective circumferential ends, and
   wherein each of two ends of said spring collet rest on the first set of one or more rollers and the second set of one or more rollers placed at respective opposing ends of the support device,
   wherein the first chain transmission device is configured to impart the rotatory motion by engaging the spring collet via the first set of one or more rollers coupled to the first chain transmission device,
   wherein the first set of one or more rollers is placed on one single side of the support device, the first chain transmission device acts on a pinion integral with a roller of the first set of one or more rollers to impart the rotary motion to the first set of one or more rollers;

wherein the second set of one or more rollers is placed on another single side of the support device and configured to be idle and free to follow rotary motion of the spring collet.

2. The plant according to claim 1, wherein the first set of one or more rollers comprises two rollers each having a said pinion integral with the roller, wherein the first chain transmission device acts on the two pinions integral with the two rollers of the first set of rollers to impart rotary motion to the first set of rollers.

3. The plant according to claim 2, wherein the first chain transmission device imparts rotary motion to the two rollers of the first set of rollers placed on one single side of the support device, and wherein the tilting motion is in reference to the axis of said spring collet with respect to the predefined plane of the support device.

4. The plant according to claim 3, wherein each impregnation station is provided with one or more impregnating substance dispenser devices, moved by controlled axles,
   wherein the dispenser devices are fed by one or more metering pumps, configured to precisely meter the impregnating substance,
   comprising at least one temperature recovery station between adjacent pairs of impregnation stations, said at least one temperature recovery station being configured to set a predefined temperature value on each component, coming from the impregnation station arranged upstream of said temperature recovery station before entering the subsequent impregnation station,
   wherein the gelling station is provided with an induction heating system, configured to raise the temperature of the component,
   comprising, downstream of the gelling station and upstream of the baking station, one or more further impregnation stations configured to dispense a further insulating substance aiming at coating welded or insulation-free metal areas of the component.

5. The plant according to claim 1, wherein each impregnation station is provided with one or more impregnating substance dispenser devices, moved by controlled axles.

6. The plant according to claim 5, wherein the one or more dispenser devices are fed by one or more metering pumps, configured to precisely meter the impregnating substance.

7. The plant according to claim 1, comprising at least one temperature recovery station between adjacent pairs of impregnation stations, said at least one temperature recovery station being configured to set a predefined temperature value on each component, coming from the impregnation station arranged upstream of said temperature recovery station before entering the subsequent impregnation station.

8. The plant according to claim 1, wherein the gelling station is provided with an induction heating system, configured to rapidly raise the temperature of the component.

9. The plant according to claim 1, comprising, downstream of the gelling station and upstream of the baking station, one or more further impregnation stations configured to dispense a further insulating substance aiming at coating welded or insulation-free metal areas of the component.

10. A method for impregnating internally hollow cylindrical components of electric motors in the impregnation plant according to claim 1, the method comprising the following steps:
    inserting each component onto a respective support device, so that said component is rotatable in both directions about a predefined axis of said support device, as well as tiltable with respect to a predefined plane of said support device;
    loading each individual support device provided with its respective component in the impregnation plant,
    rotating said component in both directions about said predefined axis and/or making said component tilt with respect to said predefined plane;
    heating said component, wherein said component is made to rotate in one or both directions about said predefined axis to reach an optimum temperature for the subsequent impregnation or resin coating step;
    impregnating or resin coating said component, wherein said component is made to rotate in both directions, at a variable speed independent of the remaining working stations of the impregnation plant, about said predefined axis, and/or is tilted with respect to said predefined plane, so that said component is at least partially coated with an impregnating substance;
    gelling the impregnating substance, wherein said component is made to rotate in one or both directions about said predefined axis to reach a suitable temperature to allow to bake said impregnating substance; and
    baking the impregnating substance to obtain the definitive solidification of said impregnating substance,
    further comprising a double weighing step for each component, wherein said component is weighed both before the step of being inserted onto the respective support device before entering the plant, and after being unloaded from the respective support device after leaving the plant, so that the difference in weight between said component before the application of the impregnating substance and the same component after the application of the impregnating substance provides an indication on how much solid impregnating substance remained on said component, thus determining a first qualitative assessment of said component.

11. The method according to claim 10, further comprising, before the step of inserting each component onto its respective support device, a preliminary pre-heating step whereby said component is pre-heated before entering the plant.

12. The method according to claim 10, wherein the gelling step is performed by way of an induction heating system, configured for rapidly raising the temperature of the component.

13. The method according to claim 10, wherein said component is made to rotate in one or both directions about said predefined axis during the impregnating substance baking step.

14. The method according to claim 10, further comprising, after the baking step, a cooling step for bringing the component down to a temperature compatible with the requirements of the manufacturing line placed downstream of the plant, where said component will continue its own assembling path.

* * * * *